United States Patent Office 2,856,378
Patented Oct. 14, 1958

2,856,378

POLYMERIZABLE UNSATURATED POLYESTER RESIN COMPOSITIONS CONTAINING SMALL AMOUNTS OF CERTAIN SATURATED ALKYD RESINS AND PROCESS OF PREPARING THE SAME

Lennart A. Lundberg, Stamford, Conn., assignor to American Cyanamid Company, New York, N. Y., a corporation of Maine No Drawing. Application January 27, 1956
Serial No. 561,942

8 Claims. (Cl. 260—31.6)

This invention relates to improved unsaturated polyester resin compositions, their copolymerization to the infusible state and the resulting products.

Unsaturated polyester resins have gone into widespread use in the laminating, molding, casting, and surface coating fields in recent years. Despite their many excellent properties, there is a continuing demand for improvement in their characteristics, especially in regard to their tensile and flexural strength under the conditions they will encounter in use.

An object of the invention is to provide an improved polymerizable unsaturated polyester resin composition.

Another object of the invention is to provide an improved process for copolymerizing an unsaturated polyester resin composition into a product of greater strength.

A further object of the invention is to provide an infusible resinous product of improved strength.

Other objects and advantages of the invention will be apparent to those skilled in the art upon consideration of the detailed disclosure hereinbelow.

The invention comprises a composition containing an unpolymerizable linear polyester in admixture with a copolymerizable mixture of an unsaturated linear polyester resin and a monomeric compound containing a $CH_2=C<$ group as well as the polymerization of said composition and the resulting infusible polymerization product. Narrower aspects of the invention include the preferred content of unpolymerizable polyester modifier, its preferred components, and the preferred species of said monomeric compound.

The modifiers employed in the present invention are unpolymerizable or saturated linear polyesters. Due to the absence of polymerizable olefinic linkages therein, it is not believed that these esters undergo either polymerization or copolymerization when incorporated in a mixture of an unsaturated polyester and a copolymerizable monomer such as styrene and subjected to copolymerizing or curing conditions which convert the mixture to the substantially infusible state.

The alcohols useful in preparing the unpolymerizable polyesters are free of nonbenzenoid unsaturation and contain two hydroxy groups per molecule. Illustrative examples of suitable alcohols are ethylene glycol, diethylene glycol, propylene glycol, dipropylene glycol, butanediol-1,4, butanediol-1,3, butanediol-1,2, pentanediol-1,4, pentanediol-1,5, hexanediol-1,6, the related polyglycols up to a molecular weight of about 6,000 such as polyethylene glycol 1000 and polypropylene glycol 500, 1,1'-[isopropylidenebis (p-phenylenoxy)] di-2-propanol of the formula:

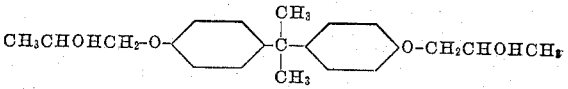

and the like, as well as mixtures thereof.

The unpolymerizable, essentially saturated polyesters are obtained by esterifying the dihydric alcohols and certain acyclic dicarboxylic acid in known manner, for instance, as described below for unsaturated polyester resins. The reaction temperature may be of the order of about 200 or 225° C.; inert atmospheres can be used to minimize color formation; and in the later stages of the reaction, subatmospheric pressures are often useful for removing water. Also xylene may be utilized in the reaction mixture as a means for removing by azeotropic distillation the water formed in the reaction. As is apparent from the examples hereinbelow, the unpolymerizable or saturated polyester should be esterified separately from the copolymerizable unsaturated polyester resin for a resin cured from a coesterification product of the same degree of saturation does not have the excellent properties realized by curing a physical mixture of an unpolymerizable polyester with an unsaturated polyester composition.

The acids suitable for preparation of the modifiers are certain saturated aliphatic dibasic acids and it does not appear that dibasic aromatic acids are capable of producing the same results. Oxalic, malonic, succinic, glutaric, adipic, pimelic, suberic, azelaic and sebacic acids may be employed alone or in admixture in the manufacture of the unpolymerizable polyesters. If desired, any available anhydrides of these acids may be substituted for the acids. Of these succinic and adipic acids are preferred by reason of their ready availability, relatively low cost and the excellent results procurable therewith.

Optionally, a minor molar proportion, that is, less than 50 mol percent of the total acids employed for esterifying the alcohol may comprise one or more fatty acids containing from about 6 to about 18 carbon atoms. It appears that the use of these acids results in the formation of mixed essentially saturated polyesters having fatty acid radicals attached to alcohol residues at one or at both ends of the chains of alternating dihydric alcohol and dibasic acid residues. Among the suitable monobasic fatty acids are caproic, caprylic, capric, lauric, myristic, palmitic, stearic, palmitoleic, oleic and linoleic acids. It will be noted that a few of these are unsaturated acids and a minor percentage of these acids is unobjectionable since they are unconjugated and therefore incapable of vinyl or addition copolymerization with the unsaturated polyester component to be described later. The monobasic fatty acids are chiefly derived from the various animal, vegetable and marine oils, fats and waxes and such sources may be employed for the present purposes providing the oils or fatty materials are of a nondrying nature. For example, the fatty acids may be obtained in conventional manner from coconut oil, palm oil, olive oil, beef tallow, or whale blubber. Accordingly, the expression "unpolymerizable polyester is employed herein to include unpolymerizle linear polyesters with end groups which may contain minor proportions of fatty acid radicals having unconjugated olefinic double bonds as well as the truly saturated polyesters which are entirely free of nonbenzenoid unsaturation.

Suitable molecular weights for the unpolymerizable polyesters range from about 1,500 to about 10,000. While polyesters of higher molecular weight, such as perhaps 15,000, are also contemplated, there is no evidence as yet that the full benefits of the invention are obtainable with such materials and there is some ground for suspicion that they may promote haziness or opacity in the novel cured copolymer products. The preferred modifying agents are viscous liquids with molecular weights between about 3,000 and about 6,000.

Besides the unpolymerizable polyester, the novel compositions contain an unsaturated polyester or alkyd resin and an essentially monomeric substance containing a $CH_2=C<$ group which is copolymerizable therewith. In general, from about 1 to about 15 parts of the unpolymerizable polyester may be present for each 100 parts of the total weight of the aforesaid other two components. Moreover, it appears that the optimum mechanical characteristics are obtained with between about 3 and about 10 parts of the unpolymerizable constituent blended into the two copolymerizable substances, and that the tensile and flexural strengths as well as the heat distortion point generally all decrease from the optimum when greater concentrations of the unpolymerizable polyester are included. Also the clarity of the cured resin often suffers with an increase in the saturated polyester. While somewhat hazy cured resins are generally useful, unpigmented thermosetting resins in the polyester field which produce opaque articles currently have little or no commercial acceptance; and opacity is sometimes encountered with an unpolymerizable polyester content from about 10 parts or up on the same basis.

In the preparation of the copolymerizable unsaturated polyester resinous component, one may make use of one or more of the ethylenically unsaturated polycarboxylic acids such as maleic, fumaric, aconitic, itaconic, and others in the class of alpha, beta unsaturated acids. These unsaturated acids should be present in an amount approximating at least 20% of the total polycarboxylic acids and preferably in amounts varying between about 25% and about 65% of the total weight of polycarboxylic acid employed in making the unsaturated polyester. Optionally, one or more saturated polycarboxylic acids, i. e., those which are free of nonbenzenoid unsaturation, phthalic, malonic, succinic, glutaric, sebacic and like acids can be used in forming the unsaturated polyester. Whenever available, the anhydrides of these acids may be used, e. g., maleic anhydride and phthalic anhydride; and the term "polycarboxylic acids" is used herein to include the polycarboxylic anhydrides when available. Also mixtures of the acids and anhydrides may be used in the preparation of the polyester resin.

The dihydric alcohols described hereinabove are equally suitable individually or as mixtures for preparing the polymerizable unsaturated polyesters. Also polyhydric alcohols containing three or more hydroxyl groups may be used in minor amounts, as for instance, glycerol, pentaerythritol, dipentaerythritol, and the like.

In the preparation of the polymerizable unsaturated polyesters, one may use the polyhydric alcohols and the polycarboxylic acids in substantially equimolar proportions, but an excess of alcohol approximating 10 to 15% above the stoichiometric quantity required for complete esterification is preferable. If polyhydric alcohols containing more than two hydroxy groups are used, calculation of the molar proportion should be made on a stoichiometric basis so as to make allowance for the additional hydroxy groups such as those found in glycerol, pentaerythritol and the like. The quantities are desirably revised in like manner when polycarboxylic acids having more than two carboxyl groups are employed. A sufficient quantity of the alcohol and acid should be reacted so as to produce an ultimate polyester resinous material having an acid number not greater than about 100 and preferably below about 55; the optimum range of acid numbers is from about 35 to 40 on certain resins.

The polymerizable unsaturated polyesters are admixed with a monomeric compound containing the polymerizable $CH_2=C<$ group to give a composition that may be cured to a stable thermoset condition. One may use about 10 parts by weight of the monomeric material to about 90 parts of the unsaturated polyester resin up to about 80 parts of the monomeric material to about 20 parts of the polymerized unsaturated polyester resin. The preferred embodiment, however, is to use from about 25 to about 35 parts of the monomeric material with about 75 to about 65 parts, respectively, of the polymerizable unsaturated polyester resin.

The monomeric material containing the polymerizable $CH_2=C<$ group has a boiling point of at least 60° C. Among the polymerizable monomeric materials that may find use in our invention are such as styrene, side-chain alkyl and halo-substituted styrenes such as alpha methylstyrene, alpha chlorostyrene, alpho ethylstyrene and the like or alkyl and halo ring-substituted styrene such as ortho, meta and para-alkyl styrenes as exemplified by o-methylstyrene, p-ethylstyrene, meta-propylstyrene, 2,4-dimethylstyrene, 2,5-diethylstyrene, bromostyrene, chlorostyrene, dichlorostyrene, and the like. Still further, one can use the allyl compounds such as diallyl phthalate, tetrachlorodiallyl phthalate, allyl alcohol, methalyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, diallyl succinnate, diallyl gluconate, diallyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

The copolymerizable ingredients of the present compositions and their preparation are well understood and many suitable examples are to be found in Kropa Patents Nos. 2,443,735 to 2,443,741, inclusive.

For curing the resinous compositions of our invention, it is necessary that a catalyst be present to effect the polymerization of the unsaturated polyester resin and the monomeric material containing the polymerizable

$$CH_2=C<$$

group. It is preferred, as is well known in the art, that a catalyst of the peroxide class be utilized. The amount of the catalyst may vary over rather wide limits, depending upon the desired rate of polymerization of the material. Thus, from about 0.01% to about 10% by weight based on the total weight of the polymerizable components may be used. While between about 0.05% and about 2% of the catalyst is generally recommended, other proportions of the catalyst may be utilized when a faster or slower rate of cure is desired. Examples of the suitable organic peroxide catalysts include benzoyl peroxide, succinyl peroxide, acetyl peroxide, methyl ethyl ketone peroxide, cumene hydroperoxide, tertiarybutyl hydroperoxide, perbenzoic acid, peracetic acid, anisoyl peroxide, toluyl peroxide, p-bromobenzoyl peroxide, furoyl peroxide and chloracetyl peroxide or any organic ozonide, and mixtures thereof.

The present modified resin compositions have wide utility in the fields of laminating, casting, molding, and in surface coatings. They may be colored according to desire in known manner by the addition of dyes, pigments or other colorants. Likewise, a variety of fillers including glass fibers, asbestos, alpha-cellulose, wood flour, talc, and other suitable additives for conventional unsaturated polyester resins may be introduced to obtain or balance certain physical characteristics of the infusible resinous products.

The products of the present invention exhibit outstanding tensile strength usually accompanied with a distinct and sometimes very large improvement in flexural strength in the atmospheric temperature range. Also significant increases in impact strength are frequently found. The action of the modifying agents in producing this result is not fully understood at present. It appears to be more than a mere plasticizing of the compositions since plasticizing does not customarily increase tensile strength but often weakens it. Moreover, the addition of a number of known plasticizers to the same unsaturated polyester compositions has not produced the benefits obtained with the novel compositions.

For a better understanding of the nature and objects of this invention, reference should be had to the accompanying illustrative detailed examples in which all portions are expressed in terms of weight unless otherwise stated therein.

RESIN A

| | | |
|---|---|---|
| Propylene glycol | mols | 6.6 |
| Phthalic anhydride | do | 3.0 |
| Maleic anhydride | do | 3.0 |
| Hydroquinone | percent | 0.008 |
| Alkyd:styrene ratio | | 70:30 |

An unsaturated polyester resin is prepared in conventional fashion by coreacting the glycol with the acid anhydrides by heating the mixture at 160° C. for about two hours and then at 190° C. until esterification is substantially complete as indicated by an acid number of about 35 to 40. Then 28 parts by weight of styrene is stirred into 72 parts of the reaction product and this is followed by addition of the indicated small percentage of hydroquinone to inhibit polymerization.

RESIN B

| | | |
|---|---|---|
| Propylene glycol | mols | 6.6 |
| Fumaric acid | do | 4.0 |
| Phthalic anhydride | do | 2.0 |
| Hydroquinone | percent | 0.008 |
| Cobalt naphthenate (calc. as Co) | do | 0.04 |
| Alkyd:styrene ratio | | 2:1 |

This composition is prepared similarly to that desribed above.

RESIN C

| | | |
|---|---|---|
| Propylene glycol | mols | 5.5 |
| Polyethylene glycol 300 (av. mol. wt.) | do | 0.5 |
| Diethylene glycol | do | 0.5 |
| Maleic anhydride | do | 5.0 |
| Phthalic anhydride | do | 1.0 |
| Hydroquinone | percent | 0.018 |
| Alkyd:diallyl phthalate ratio | | 67:33 |

This composition is prepared like Resin A except that slightly more than half of the hydroquinone is added with the glycols and acidic reactants while the balance is subsequently stirred into the resulting unsaturated polyester along with the monomeric diallyl phthalate.

*Example 1*

As a control, 1% of a mixture of equal weights of benzoyl peroxide and tricresyl phosphate is stirred thoroughly into a sample of Resin A to catalyze the resin. Then test castings of 1/8" and 1/4" thickness on glass plates treated with a parting agent are made by curing the resin for a total of seventeen hours during which a temperature of 125° F. is maintained for six hours followed by gradually raising the temperature to 250° F. over the next nine hours and maintaining the 250° F. temperature for the last two hours. The castings are tested according to A. S. T. M. methods using an Instron instrument with a cross-head speed of 1 inch per minute for measuring the data relating to tensile and flexural strength.

The same procedure is followed in testing several modified resins produced by stirring varying percentages of polypropylene glycol adipate into Resin A. This completely saturated polyester is a viscous liquid with a molecular weight of approximately 5,600 obtained by esterifying adipic acid with about 10% excess propylene glycol. The percentages stated in the table hereinbelow represent the percentage of the modifier based on the weight of Resin A rather than the total weight of the composition. The cured modified resins exhibit no tendency to sweat or bleed upon aging for extended periods at moderately elevated and at room temperatures.

*Comparative Example 2*

A polyester having a relatively low degree of saturation is prepared by esterifying 6 mols of diethylene glycol, 5.5 mols of adipic acid and 0.5 mol of maleic anhydride in the manner indicated for Resin A. The casting and test procedure of Example 1 is repeated with a mixture made up by thoroughly stirring 5 parts of this polyester into 100 parts of Resin A and the stated catalyst at room temperature. The data obtained are set forth in Table I.

*Comparative Example 3*

Example 1 is repeated substituting 5% of monomeric butyl benzyl phthalate, a well-known plasticizer, as the modifier for Resin A. The results are tabulated below.

TABLE I

| Percent Modifier | Heat Dist. Point, °C. | Barcol Hardness | Tensile Strength, p.s.i. | Elongation, percent | Flexural Strength, p.s.i. | | Flexural Modulus ×10⁶ | | Impact Strength Notched Izod, ft. lbs./inch |
|---|---|---|---|---|---|---|---|---|---|
| | | | | | 25° C. | 60° C. | 25° C. | 60° C. | |
| 0 | 77 | 51 | 8,100 | 2.7 | 15,300 | 11,600 | 0.62 | 0.33 | ³ 0.24 |
| 2.5 | | 43 | 10,400 | 3.4 | 17,300 | | 0.57 | | |
| 5 | 73 | 38 | 12,200 | 4.7 | 16,900 | 11,200 | 0.52 | 0.31 | ³ 0.30 |
| 5 ¹ | 66 | 46 | 9,600 | 3.7 | 16,200 | 8,900 | 0.50 | 0.26 | |
| 5 ² | | 47 | 6,300 | 2.2 | 10,500 | 7,800 | 0.58 | 0.24 | |
| 7.5 | | 33 | 11,200 | 4.9 | 16,400 | 9,700 | 0.49 | 0.21 | ³ 0.33 |
| 10 | | 23 | 9,800 | 4.6 | 15,200 | 8,200 | 0.44 | 0.22 | ³ 0.30 |

¹ Comparative Example 2 with diethylene glycol-adipate-maleate polyester modifier.
² Comparative Example 3 with monomeric butyl phthalate modifier.
³ Impact strength values obtained on samples cured 16 hours at 125° F., 5 hours rising from 125 to 250° F. and 2 hours at 250° F.

From the above results it is apparent that a saturated polyester additive produces a highly desirable and significant increase in tensile strength along with an appreciable increase in flexural strength at 25° C. together with losses in heat distortion characteristics and the flexural strength at elevated temperatures which are minor and acceptable for most commercial uses. On the other hand with a polyester of a comparatively low degree of unsaturation a much smaller improvement in the tensile and flexural strength at room temperature occurs and this is accompanied by much poorer characteristics at elevated temperature as exemplified by a considerable loss in flexural strength at 60° C. and a significantly lower heat distortion point. In the case of the monomeric plasticizer, no improvement in any qualities is observable and the undesirable tendency of such materials to bleed or evaporate from the cured resin upon aging or upon exposure to heat is well known.

*Comparative Example 4*

Example 1 is repeated in part using a propylene glycol isophthalate polyester, a substance free of nonbenzenoid unsaturation, as a modifier for Resin A in place of the adipic ester. The testing is discontinued when it is apparent that a very minor improvement in tensile strength is accompanied by losses in flexural strength at both 25° and 80° C. which are far too great for many commercial purposes.

Example 5

Example 1 is repeated substituting a propylene glycol succinate saturated polyester of acid number 1.0, hydroxyl number 61.3, and calculated molecular weight of 1800 in place of the adipic ester with the results set forth in Table II. No tendency toward bleeding of the cast resin in aging is observed at either moderately elevated or at room temperatures.

TABLE II

| Percent Modifier | Barcol Hardness | Tensile Strength, p. s. i. | Elongation, Percent | Flexural Strength, p. s. i. | | Flexural Modulus ×10⁶ | |
|---|---|---|---|---|---|---|---|
| | | | | 25° C. | 60° C. | 25° C. | 60° C. |
| 0 | 51 | 8,100 | 2.7 | 15,300 | 11,600 | 0.62 | 0.33 |
| 5 | 47 | 8,500 | 3.2 | 16,900 | 9,700 | 0.55 | 0.28 |
| 7.5 | 44 | 9,400 | 3.8 | 16,200 | 7,600 | 0.51 | 0.22 |
| 10 | 41 | 10,100 | 4.6 | 14,200 | 7,000 | 0.47 | 0.19 |
| 12.5 | 37 | 7,700 | 3.5 | 14,700 | 6,500 | 0.43 | 0.18 |

Example 6

The procedure of Example 1 is substantially duplicated with Resin B substituted in place of Resin A. The results obtained with this more highly unsaturated resin are even more striking than those in Example 1 as is apparent from the following table.

TABLE III

| Percent Modifier | Heat Dist. Point, °C. | Barcol Hardness | Tensile Strength, p. s. i. | Elongation, Percent | Flexural Strength, p. s. i. | | Flexural Modulus ×10⁶ | |
|---|---|---|---|---|---|---|---|---|
| | | | | | 25° C. | 80° C. | 25° C. | 80° C. |
| 0 | 97 | 50 | 5,600 | 1.7 | 9,900 | 10,400 | 0.57 | 0.29 |
| 5 | 100 | 44 | 8,500 | 3.0 | 13,900 | 8,200 | 0.50 | 0.25 |
| 10 | 85 | 30 | 9,400 | 4.2 | 15,000 | 7,200 | 0.44 | 0.20 |
| 15 | 87 | 18 | 8,200 | 4.3 | 12,400 | 5,600 | 0.38 | 0.16 |

Example 7

Example 1 is again repeated with the exception that Resin C is substituted for Resin A and the test data are set forth in Table IV. The control data in the table relate to a resin differing from Resin C only in having an alkyl:diallyl phthalate ratio of 69:31, but it is not believed that the values are substantially altered by this minor variation.

TABLE IV

| Percent Modifier | Barcol Hardness | Tensile, p. s. i. | Elongation, Percent | Flexural Strength, p. s. i. | | | | Flexural Modulus ×10⁶ | | | |
|---|---|---|---|---|---|---|---|---|---|---|---|
| | | | | 25° C. | 60° C. | 80° C. | 100° C. | 25° C. | 60° C. | 80° C. | 100° C. |
| 0 | 57 | 4,200 | 1.7 | 11,100 | 7,500 | 7,100 | 5,100 | 0.49 | 0.34 | 0.29 | 0.21 |
| 5 | 45 | 4,900 | 2.1 | 10,000 | 7,300 | 5,000 | 5,000 | 0.44 | 0.30 | 0.24 | 0.20 |
| 10 | 36 | 7,000 | 3.7 | 11,200 | 7,600 | 6,800 | 4,900 | 0.40 | 0.25 | 0.20 | 0.17 |
| 15 | 25 | 5,500 | 3.3 | 10,200 | 6,400 | 5,200 | 4,500 | 0.33 | 0.20 | 0.16 | 0.14 |

The modified resins here display an outstanding increase in tensile strength coupled with no significant change in flexural strength even at rather high temperatures until the modifier content exceeds 10% and even then the decrease is generally acceptable.

Example 8

The procedure of Example 1 is again followed in modifying Resin A with 5% of a mixed sebacic and adipic acid polyester of propylene glycol. The modifier here is esterified similarly to Resin A to a molecular weight of about 4000 with acid radical contents corresponding to 74% propylene glycol sebacate and 26% propylene glycol adipate. After casting and curing, the modified resin was found to have a tensile strength of 11,100 and flexural strength of 15,700 at 25° C. and 9,500 p. s. i. at 60° C. in comparison with control values of 8,100, 15,300 and 11,600, respectively.

Example 9

A modifier is prepared by heating a mixture of 6.6 mols of propylene glycol, 5 mols of adipic acid and 2 mols of coconut oil fatty acids at temperatures of 205–215° C. for 27 hours under a blanket of carbon dioxide gas. The resulting light-colored resinous syrup with a viscosity of U− on the Gardner-Holdt scale and an acid number of 3.7 is a saturated polyester probably stoppered with fatty acid radicals at the ends of the linear chains. Example 1 is repeated using 5% of this modifying agent in Resin A. The modified cured resin is found to have a tensile strength of 11,100 and flexural strength of 17,300 at 25° C. and 8,400 p. s. i. at 60° C. in comparison with control values of 8,100, 15,300 and 11,600, respectively. The impact strength by the Izod method is unchanged and the Barcol value is 43.

Example 10

The procedure of Example 1 is followed in general, using 7.5% modifier in the form of a polyester of propylene glycol and adipic acid having an average molecular weight of about 9800 in Resin B. After curing under the conditions specified in Table I for impact strength samples, it is found that impact strength by the notched Izod method is 0.37 ft. lb./inch in comparison with the control value of 0.24.

Example 11

The procedure of Example 10 is duplicated with the substitution of 7.5% of a polyester of dipropylene glycol and adipic acid with a molecular weight averaging 4300 as the modifier. The impact strength here is found to be 0.30 ft. lb./inch in comparison with the control value of 0.24.

While there are above disclosed only a limited number of embodiments of the composition, process and product of the invention herein presented, it is possible to produce still other variations without departing from the inventive concept herein disclosed; and it is desired, therefore, that only such limitations be imposed on the appended claims as are stated therein or required by the prior art.

I claim:

1. A composition of matter which comprises between about 1 and about 15 parts by weight of a polyester of propylene glycol and adipic acid in admixture with 100 parts of a copolymerizable mixture of an unsaturated linear polyester resin prepared by reacting a polyhydric alcohol with an alpha, beta ethylenically unsaturated dicarboxylic acid and a monomeric compound containing a $CH_2=C<$ group.

2. A composition of matter which comprises between about 3 and about 10 parts by weight of a polyester of propylene glycol and adipic acid in admixture with 100 parts of a copolymerizable mixture of an unsaturated linear polyester resin prepared by reacting a polyhydric alcohol with an alpha, beta ethylenically unsaturated dicarboxylic acid and styrene.

3. A composition of matter which comprises between about 3 and about 10 parts by weight of a polyester of propylene glycol and adipic acid in admixture with 100 parts of a copolymerizable mixture of an unsaturated linear polyester resin prepared by reacting a polyhydric alcohol with an alpha, beta ethylenically unsaturated dicarboxylic acid and diallyl phthalate.

4. A composition of matter which comprises a substantially infusible resin produced by copolymerizing a mixture containing between about 1 and about 15 parts by weight of a polyester of propylene glycol and adipic acid in admixture with 100 parts of a copolymerizable mixture of an unsaturated linear polyester resin prepared by reacting a polyhydric alcohol with an alpha, beta ethylenically unsaturated dicarboxylic acid and a monomeric compound containing a $CH_2=C<$ group.

5. A composition of matter which comprises a substantially infusible resin of improved tensile strength produced by copolymerizing a mixture containing between about 3 and about 10 parts by weight of a polyester of propylene glycol and adipic acid in admixture with 100 parts of a copolymerizable mixture of an unsaturated linear polyester resin prepared by reacting a polyhydric alcohol with an alpha, beta ethylenically unsaturated dicarboxylic acid and styrene in the presence of a polymerization catalyst.

6. A composition of matter which comprises a substantially infusible resin of improved tensile strength produced by copolymerizing a mixture containing between about 3 and about 10 parts by weight of a polyester of propylene glycol and adipic acid in admixture with 100 parts of a copolymerizable mixture of an unsaturated linear polyester resin prepared by reacting a polyhydric alcohol with an alpha, beta ethylenically unsaturated dicarboxylic acid and diallyl phthalate in the presence of a polymerization catalyst.

7. A process which comprises copolymerizing 100 parts of a copolymerizable mixture of an unsaturated linear polyester resin prepared by reacting a polyhydric alcohol with an alpha, beta ethylenically unsaturated dicarboxylic acid and a polymerizable monomeric compound containing a polymerizable $CH_2=C<$ group into a substantially infusible resin in the presence of from about 1 to about 15 parts by weight of a saturated linear polyester resin of propylene glycol and adipic acid and a polymerization catalyst for said copolymerizable mixture.

8. A process comprising copolymerizing 100 parts of a copolymerizable mixture of an unsaturated linear polyester resin prepared by reacting a polyhydric alcohol with an alpha, beta ethylenically unsaturated dicarboxylic acid and styrene into a substantially infusible resin in the presence of a polymerization catalyst for said copolymerizable mixture and from about 1 to about 15 parts by weight of a polyester resin of propylene glycol and adipic acid.

References Cited in the file of this patent

UNITED STATES PATENTS

| | | |
|---|---|---|
| 2,255,313 | Ellis | Sept. 9, 1941 |
| 2,642,403 | Simon et al. | June 16, 1953 |

UNITED STATES PATENT OFFICE
CERTIFICATE OF CORRECTION

Patent No. 2,856,378 — October 14, 1958

Lennart A. Lundberg

It is hereby certified that error appears in the printed specification of the above numbered patent requiring correction and that the said Letters Patent should read as corrected below.

Column 2, line 53, for "polyester" read -- polyesters --; column 2, line 54, for "unpolymerizle" read -- unpolymerizable --; column 4, line 6, for "alpho" read -- alpha --; line 13, for "methalyl" read -- methallyl --; columns 5 and 6, Table I, footnote 2, before "phthalate" insert -- benzyl --.

Signed and sealed this 6th day of January 1959.

(SEAL)
Attest:

KARL H. AXLINE
Attesting Officer

ROBERT C. WATSON
Commissioner of Patents